United States Patent
Skripkin

(10) Patent No.: US 8,340,912 B2
(45) Date of Patent: Dec. 25, 2012

(54) SEISMIC ATTRIBUTES FOR STRUCTURAL ANALYSIS

(75) Inventor: Sergey Skripkin, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 434 days.

(21) Appl. No.: 12/705,653

(22) Filed: Feb. 15, 2010

(65) Prior Publication Data

US 2011/0046884 A1    Feb. 24, 2011

Related U.S. Application Data

(60) Provisional application No. 61/153,025, filed on Feb. 17, 2009.

(51) Int. Cl.
*G06F 19/00* (2011.01)
*G06F 17/40* (2006.01)
*G01V 1/30* (2006.01)

(52) U.S. Cl. . 702/11; 73/152.05; 73/865.8; 166/250.01; 175/50; 181/101; 367/14; 367/38; 702/187; 702/189; 708/200

(58) Field of Classification Search ............... 73/152.01, 73/152.02, 152.05, 432.1, 865.8; 166/244.1, 166/250.01; 175/40, 50; 181/101; 250/253; 324/323; 367/14, 37, 38; 702/1, 2, 6, 11, 702/14, 127, 187, 189; 708/100, 105, 200
See application file for complete search history.

(56) References Cited

U.S. PATENT DOCUMENTS

| | | | | |
|---|---|---|---|---|
| 2,569,411 A | * | 9/1951 | Ellis | 367/37 |
| 2,800,639 A | * | 7/1957 | Lee | 367/53 |
| 2,908,889 A | * | 10/1959 | Piety | 367/63 |
| 2,978,673 A | * | 4/1961 | Graham | 367/49 |
| 3,015,085 A | * | 12/1961 | Piety | 367/37 |
| 3,217,289 A | * | 11/1965 | Elliott et al. | 367/40 |
| 3,449,047 A | * | 6/1969 | Hartmann | 355/2 |
| 4,745,550 A | | 5/1988 | Witkin | |
| 4,745,562 A | | 5/1988 | Prazdny | |
| 5,038,378 A | | 8/1991 | Chen | |
| 5,416,750 A | | 5/1995 | Doyen | |
| 5,444,619 A | | 8/1995 | Hoskins | |
| 5,563,949 A | | 10/1996 | Bahorich | |
| 5,940,778 A | * | 8/1999 | Marfurt et al. | 702/16 |
| 5,987,388 A | | 11/1999 | Crawford | |
| 6,240,370 B1 | | 5/2001 | Sonneland | |
| 6,463,387 B1 | | 10/2002 | Runnestrand | |
| 6,473,697 B2 | | 10/2002 | Bouts | |
| 6,640,190 B2 | | 10/2003 | Nickel | |
| 6,735,526 B1 | | 5/2004 | Meldahl | |
| 6,950,786 B1 | | 9/2005 | Sonneland | |

(Continued)

FOREIGN PATENT DOCUMENTS

GB    2468023 A  *  8/2010

(Continued)

*Primary Examiner* — Edward Cosimano

(57) ABSTRACT

Embodiments of methods and systems for analysis of geological structures using seismic attributes are described. In some embodiments, a method includes computing a similarity function using one or more seismic attributes at a location within the geological structure along an I direction and a J direction; computing a total optimal similarity function in at least one plane defined by the I and J directions; computing a minimum possible value of the total similarity function for a defined range of rotations; and calculating a discontinuity measure based at least partially on the minimum possible value of the total similarity function.

20 Claims, 4 Drawing Sheets

U.S. PATENT DOCUMENTS

| | | | |
|---|---|---|---|
| 6,988,038 B2 * | 1/2006 | Trappe et al. | 702/17 |
| 7,069,149 B2 | 6/2006 | Goff | |
| 7,082,368 B2 | 7/2006 | Nickel | |
| 7,248,539 B2 | 7/2007 | Borgos | |
| 7,330,791 B2 | 2/2008 | Kim | |
| 7,423,432 B2 | 9/2008 | Amundsen | |
| 7,484,563 B2 | 2/2009 | Zazovsky | |
| 7,567,084 B2 | 7/2009 | Eidesmo | |
| 7,627,429 B2 | 12/2009 | Li | |
| 7,630,865 B2 | 12/2009 | Berkovitch | |
| 2004/0210394 A1 * | 10/2004 | Trappe et al. | 702/14 |
| 2006/0042793 A1 | 3/2006 | Del Campo | |
| 2007/0078604 A1 * | 4/2007 | Kim et al. | 702/16 |
| 2009/0132169 A1 | 5/2009 | Bordakov | |
| 2009/0187391 A1 | 7/2009 | Wendt | |

FOREIGN PATENT DOCUMENTS

| | | |
|---|---|---|
| WO | 9713166 | 4/1997 |
| WO | 2004044615 | 5/2004 |
| WO | 2009004869 | 4/2009 |

* cited by examiner

SEISMIC ATTRIBUTES FOR STRUCTURAL ANALYSIS

CROSS-REFERENCE TO RELATED APPLICATIONS

This patent application claims priority under 35 USC §119 (e) from U.S. Provisional Patent Application No. 61/153,025 filed Feb. 17, 2009, which application expired on Feb. 17, 2010 and is incorporated herein by reference.

FIELD OF THE INVENTION

The present disclosure relates to computational simulation and analysis of geological formations, and more specifically, to simulation and analysis of geological structures using seismic attributes.

BACKGROUND

Research operations, such as surveying, drilling, testing, and computational simulations, are typically performed to help locate and extract valuable hydrocarbon resources. The information developed during such research operations may be used to assess geological formations, and to locate the desired subterranean assets.

Seismic data are routinely and effectively used to estimate the structure of reservoir bodies. Processing of seismic data produces "seismic attributes" which may be effectively used to interpret the underlying geological structure. Typically, seismic attributes may be considered mathematical transformations on seismic data, and may include, for example, acoustic impedance, and velocity, reflection heterogeneity and instantaneous frequency, depth, dip angle, and azimuth angle. Conventional methods and systems for simulation and analysis of geological structures using seismic attributes, include those described, for example, in U.S. Pat. No. 7,082,368 issued to Nickel, U.S. Pat. No. 6,950,786 issued to Sonneland et al., U.S. Pat. No. 6,240,370 issued to Sonneland et al., and U.S. Pat. No. 5,444,619 issued to Hoskins et al., which patents are hereby incorporated by reference. Although desirable results have been achieved using such conventional techniques, there is room for improvement.

SUMMARY

The present disclosure relates to methods and systems for analysis of geological structures using seismic attributes. Embodiments of methods and systems in accordance with the teachings of the present disclosure may advantageously avoid drawbacks typical to many conventional analysis algorithms that rely on direct spatial correlation measure, thereby providing improved structural interpretations.

In some embodiments, a method in accordance with the present disclosure includes analyzing a geological structure based at least partially on one or more seismic attributes, including: computing a similarity function using one or more seismic attributes at a location within the geological structure along an I direction and a J direction; computing a total optimal similarity function in at least one plane defined by the I and J directions; computing a minimum possible value of the total similarity function for a defined range of rotations; and calculating a discontinuity measure based at least partially on the minimum possible value of the total similarity function.

This summary is merely intended to provide a brief synopsis of a possible implementation of, and possible aspects or advantages of, systems and methods in accordance with at least some embodiments of the present disclosure. This summary is further intended as merely an aid to the reader's understanding of such particular embodiments, and is not intended to define or limit other embodiments of systems and methods disclosed elsewhere herein.

BRIEF DESCRIPTION OF THE DRAWINGS

The detailed description is described with reference to the accompanying figures, in which similar or identical reference numerals may be used to identify common or similar elements.

DETAILED DESCRIPTION

This disclosure is directed to methods and systems for structural analysis of geological structures using seismic attributes. More specifically, embodiments of methods and systems in accordance with the teachings of the present disclosure may use novel three-dimensional (3D) seismic attributes for analysis of geological structures, including identification of terminations and other suitable analyses.

In at least some implementations, systems and methods in accordance with the present disclosure may advantageously overcome drawbacks typical to many other structural analysis algorithms based on direct spatial correlation measure. For example, such systems and methods may advantageously provide robust estimation of "dip angles" of subterranean reservoir layers, and may allow improved control over the estimation process via "user settings." Additional advantages or aspects of systems and methods in accordance with the present disclosure will become apparent through review of the following detailed description.

Exemplary Environment

Figure 1:
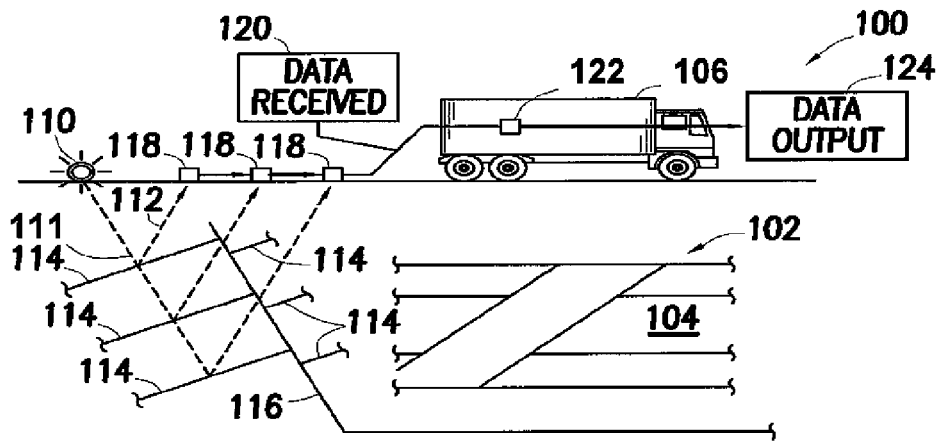
FIG. 1 is a schematic view of an exemplary environment which may be modeled in accordance with the teachings of the present disclosure.

FIG. 1 is a schematic view of an exemplary environment 100 which may be modeled in accordance with the teachings of the present disclosure. More specifically, in this embodiment, the environment (or oilfield) 100 includes a subterranean formation 102 containing a reservoir 104 therein. A seismic truck 106 performs a survey operation by producing one or more waves 111 (e.g. sonic waves, ultrasonic waves, electromagnetic waves, etc.) that may be used to generate seismic data regarding the subterranean formation 102.

More specifically, as shown in FIG. 1, one or more waves 111 are emitted by a source 110 and reflect off one or more horizons 114 in an earth formation 116. The reflected waves 112 are then received or detected by one or more sensors, such as geophone-receivers 118 or the like, situated on the surface. In at least some embodiments, the geophone-receivers 118 produce electrical output signals in response to the characteristics of the reflected waves 112 (e.g. amplitude, frequency, etc.), referred to as seismic data received 120 in FIG. 1.

The seismic data received 120 may be provided as input to a computer 122 (e.g. located in the seismic truck 106 or elsewhere). Responsive to the input data, the computer 122 may generate a seismic data output 124 which may be stored, transmitted, or further processed as desired, including by various analysis techniques in accordance with the teachings of the present disclosure.

Additional aspects of systems and methods of simulating geological structures using seismic attributes described in the following sections. It should be appreciated that the systems and methods described herein are merely exemplary, and are included for illustration purposes and should not be construed as limiting.

Exemplary Processes

Attribute analysis is generally known as a powerful tool for analysis of seismic data. Fault and termination identification is typically part of attribute analysis, especially when it comes to three-dimensional (3D) seismic data analysis. Many known and used methods of fault identification are based on the measures of coherency-type attributes, variance, stability of gradient estimations, etc. One major drawback of such conventional methods, however, is that they may not be able to distinguish uncorrelated noise and fault discontinuity, so interpretation is needed to extract real fault traces from just noisy areas. In at least some implementations described herein, a set of proposed attributes is described which does not suffer from such limitations.

Figure 2:
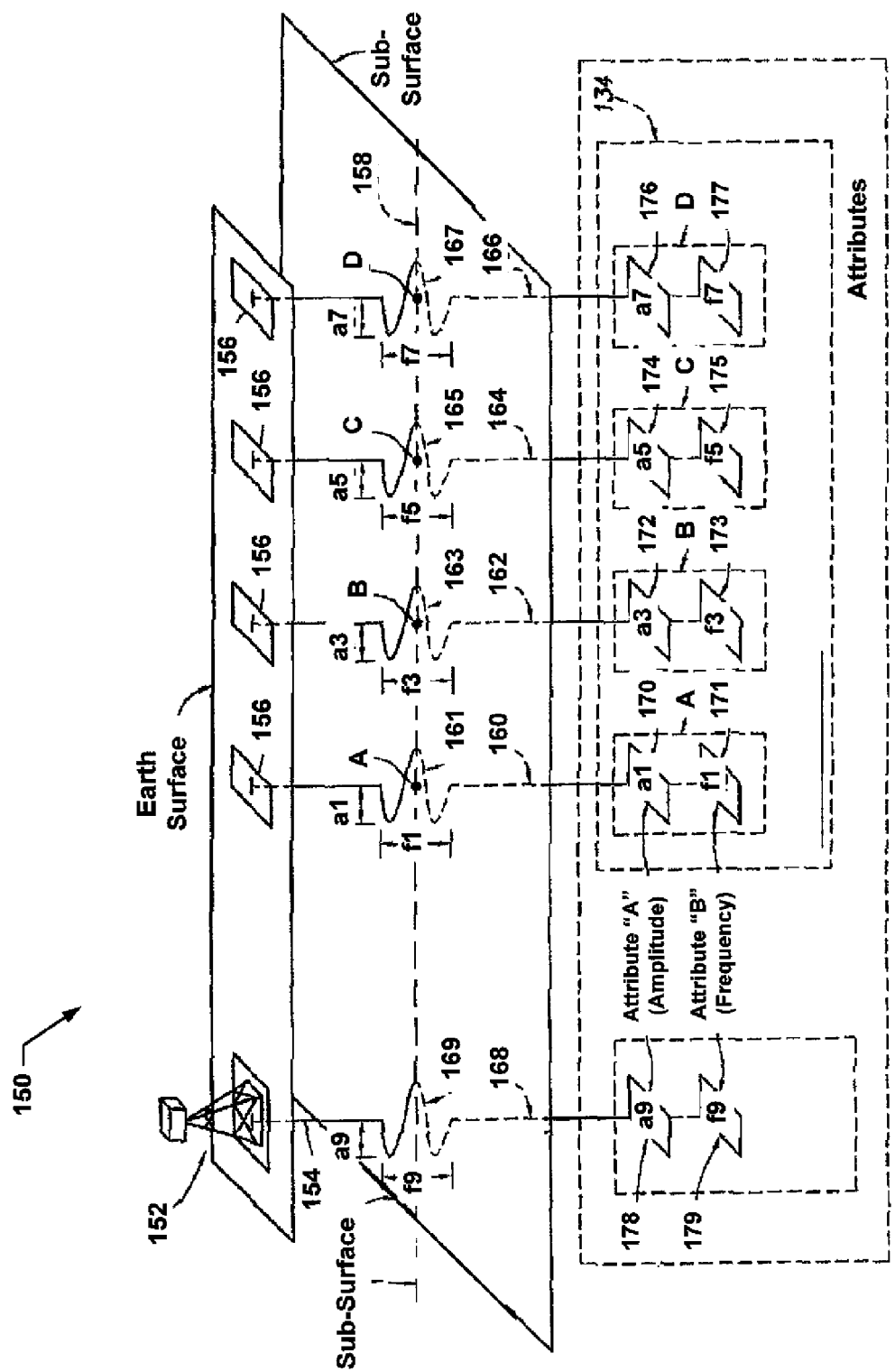
FIG. 2 illustrates an exemplary method of gathering seismic data and corresponding seismic attributes in accordance with the teachings of the present disclosure.

FIG. 2 illustrates an exemplary method 150 of gathering seismic data and corresponding seismic attributes in accordance with the teachings of the present disclosure. In this embodiment, a well 152 is located on an earth surface above a wellbore 154 which penetrates a geological formation. A plurality of seismic instruments 156 (e.g. geophones, etc.) located on the earth surface emit signals into the geological formation which intersect a subsurface layer (or location) 158 at a corresponding plurality of points A, B, C, D.

In FIG. 2, point A on the subsurface layer 158 has a seismic trace 160 which includes an amplitude variation 161, the amplitude variation 161 having an amplitude a1 and a frequency f1. Similarly, points B, C, and D on the subsurface layer 158 have seismic traces 162, 164, 166, respectively, each seismic trace having a corresponding amplitude variation 163, 165, 167, respectively, each amplitude variation having a corresponding amplitude a3, a5, a7, and a corresponding frequency f3, f5, f7, respectively.

As further shown in FIG. 2 (generally at 134), for point A on the subsurface layer 158, one attribute 170 associated with point A is amplitude a1, and another attribute 171 associated with point A is frequency f1. Similarly, for point B, one attribute 172 associated with point B is amplitude a3, and another attribute 173 associated with point B is frequency f3. For point C, one attribute 174 is amplitude a5 and another attribute 175 is frequency f5. And for point D, one attribute 176 is amplitude a7 and another attribute 177 is frequency f7.

However, a seismic trace having an amplitude variation may also be associated with the wellbore 154. That is, in FIG. 2, a seismic trace 168 having an amplitude variation 169 is associated with the wellbore 154, the amplitude variation 169 having an amplitude a9 and a frequency f9. Therefore, for the wellbore 154, one attribute 178 associated with the wellbore 154 is amplitude a9 and another attribute 179 associated with the wellbore 154 is frequency f9. More specifically, the attributes 178, 179 associated with the wellbore 154 may be considered "synthesized" attributes because the data obtained from the wellbore 154 are not seismic data, and from the non-seismic wellbore data, the seismic trace 168 may be "synthesized" and attributes 178, 179 generated.

Figure 3:
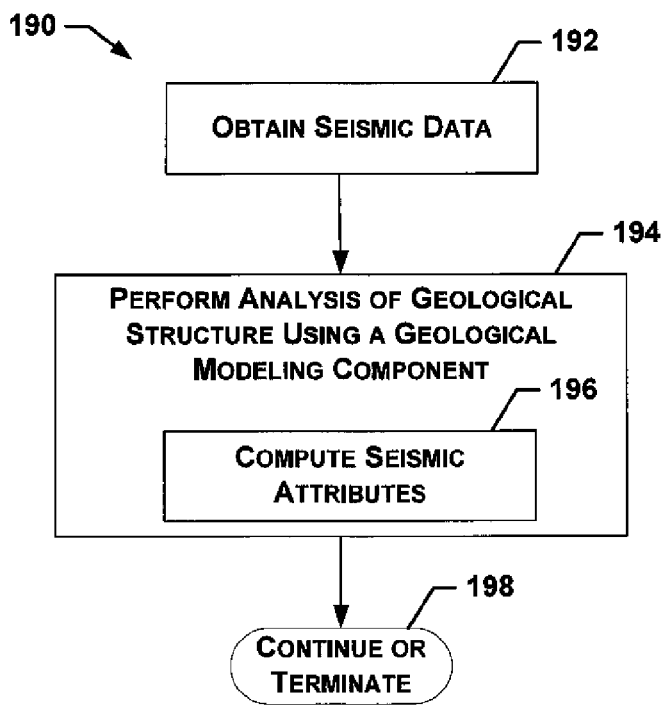
FIG. 3 is an embodiment of a method of simulating a geological structure using seismic attributes in accordance with the teachings of the present disclosure.

FIG. 3 is an embodiment of a method 190 of analyzing a geological structure using seismic attributes in accordance with the teachings of the present disclosure. In this simplified embodiment, the method 190 includes obtaining seismic data at 192 (e.g. using a seismic system as described above with respect to FIG. 1, or retrieving existing data from storage), and performing analysis of a geological structure using a geological modeling component at 194. It will be appreciated that a variety of suitable components for simulation and analysis of geological structures are known, including, for example, the SEISCLASS software product owned by Schlumberger Technology Corporation, or similar components for geological analysis owned by or available from Roxar Software Solutions, Inc., Quantitative Geosciences, Inc., Chevron, and many others.

As further shown in FIG. 3, performance of an analysis of a geological structure using a geological modeling component at 194 may include computing seismic attributes at 196. Novel methods for computing seismic attributes (e.g. at 196) in accordance with the teachings of the present disclosure are described more fully below. Finally, the method 190 includes continuing (e.g. iteratively returning to perform additional analyses at 194), or terminating at 198.

It should be appreciated that the computation of seismic attributes may be performed as part of the analysis of the geological structure at 194, as shown in FIG. 3, or may be performed separately, such as prior to initiating the analysis of the geological structure. Therefore, the method 190 shown in FIG. 3 is merely exemplary of a possible embodiment, and systems and methods in accordance with the present disclosure should not be construed as being limited to the particular embodiment shown in FIG. 3.

To begin to describe computation of seismic attributes in accordance with the teachings of the present disclosure, several definitions will now be introduced. For example, as used herein, a template $\Omega$ denotes an array of points $\omega$ with integer Cartesian coordinates (i,j,k) selected according to some custom rule, as shown in the following Equation (1):

$$\Omega=\{\omega_1,\ldots,\omega_n\}, \omega_m=(i_m,j_m,k_m) \quad (1)$$

Similarly, as used herein, a sample $\Lambda$ extracted around kernel point K using a template with parameters $(\phi,\theta,\psi)$ denotes an array of $\lambda$, defined by the following Equation (2):

$$\Lambda_\Omega^{K_0}(K,\phi,\theta,\psi)=(\lambda_1,\ldots,\lambda_n), \lambda_m=S(K+\omega_m^{\phi,\theta,\psi}) \quad (2),$$

where S(t) denotes interpolated value of 3D seismic volume at point t with Cartesian coordinates (x,y,z), indexes $\phi,\theta,\psi$ at point $\omega$ mean sequential rotation of applied template $\Omega$ to angle $\phi$ around Z axis and to angle $\theta$ around axis X, and to angle $\psi$ around axis Y (or any suitable combination or ordering thereof) and K0 is zero point of coordinate system where template rotation is performed.

Now, using notation introduced above it is possible to define a new measure of distance between two arbitrary points K1 and K2 in a seismic volume, referred to herein as a sample-based distance, as shown in the following Equation (3):

$$L(\Lambda_\Omega(K_1,\varphi_1,\theta_1,\psi_1),\Lambda_\Omega(K_2,\varphi_2,\theta_2,\psi_2)) = \frac{\|\Lambda_\Omega(K_1,\varphi_1,\theta_1,\psi_1) - \Lambda_\Omega(K_2,\varphi_2,\theta_2,\psi_2)\|}{\|\Lambda_\Omega(K_1,\varphi_1,\theta_1,\psi_1) + \Lambda_\Omega(K_2,\varphi_2,\theta_2,\psi_2)\|} \quad (3)$$

This measure allows a defining degree of similarity between different points in seismic volume in terms of selected template and angles. For example, a simple one-point template $\Omega=\{(0,0,0)\}$ can lead to direct comparison of seismic amplitudes in locations K1 and K2.

It will be appreciated that, in at least some implementations, methods and systems in accordance with the present disclosure are not based on explicit calculations of spatial correlation of the seismic signal. Instead, such methods and systems may be based on fundamental differences between main classes of areas in a seismic signal. For example, in some implementations, the classes may be designated as follows: areas without any discontinuities, faults or other termination areas with one or more discontinuities along a particular surface, and chaotic areas with many isotropic discontinuities. Listed classes may not just be theoretical, and in nature, areas of seismic data may include mixtures of these class types. However, if it will be possible to construct a robust measure of every point belonging to a fault class, such measure may advantageously be used as a fault indicator.

In some implementations, the characteristics of (or differences between) reservoir classes or zones may be described in terms of a correlation between samples. As used herein, the term "correlation between samples" may be interpreted as a small sample-based distance between points along a selected direction. In at least some implementations, three main classes or zones may be described as follows:

Fault area: Good correlation between samples along only one particular direction in the fault surface ("main direction"). Bad or no correlation between samples along any direction perpendicular to the main direction.

Chaotic area: No "main direction", bad or no correlation between samples along any direction.

Area without discontinuities: Good correlation between samples along any direction in a particular plane (defined by local dip angle and dip azimuth). No "main direction".

In addition, a generalized template $\hat{\Omega}$ can be defined using a simple template $\Omega$ given by Equation (4) below:

$$\hat{\Omega} = \bigcup_{i=-\tau, j=-\tau}^{i=\tau, j=\tau} \eta_{ij}\{\omega + (i, j, 0)\} \forall \, \omega \in \Omega, \quad (4)$$

where $\tau$ represents a width of generalization, and coefficients $\eta$ are equal to 1 or 0 depending on the presence of point (i,j,0) in a generalization. Removing part of the points using these coefficients can be performed for increasing the algorithm's performance. In some implementations, if performance is relatively less important, it may be possible to set $\eta=1$.

The generalized sample then may be defined using Equation (5) as follows:

$$\hat{\Lambda}_{\hat{\Omega}}(K, \varphi, \theta, \psi) = \bigcup_{i=-\tau, j=-\tau}^{i=\tau, j=\tau} \eta_{ij} \Lambda^K(K + (i, j, 0), \varphi, \theta, \psi) \quad (5)$$

It will be appreciated that rotations $(\varphi,\theta,\psi)$ can be applied to the corresponding general template, i.e. zero of local coordinate system can be defined by a kernel of template without shift (K).

Measures of similarity between kernels along I and J directions in a general sample may be introduced using Equations (6) and (7) as follows:

$$SimI(K, \varphi, \theta, \psi) = \sum_{\Lambda_t, \Lambda_r \in \hat{\Lambda}, t > r} L(\Lambda_t(K_t, \varphi, \theta, \psi), \Lambda_r(K_r, \varphi, \theta, \psi))\mu_{tr}^I \quad (6)$$

$$SimJ(K, \varphi, \theta, \psi) = \sum_{\Lambda_t, \Lambda_r \in \hat{\Lambda}, t > r} L(\Lambda_t(K_t, \varphi, \theta, \psi), \Lambda_r(K_r, \varphi, \theta, \psi))\mu_{tr}^J \quad (7)$$

Weights $\mu$ are defined based on an actual form of function to be used. A simple case with generalization width equal to I is described in the following example. Consider numeration of individual templates in a generalized template (having width equal to 1) in accordance with a possible embodiment as shown in Diagram A below.

Diagram A.

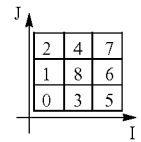

Templates numeration in general template, width = 1.

In this embodiment, possible sets of coefficients $\mu$ may be given by Equations (8) and (9) as follows:

$$\mu^I = \begin{pmatrix} 0 & 0 & 0 & 1 & 0 & 0 & 0 & 0 & 0 \\ 0 & 0 & 0 & 0 & 0 & 0 & 0 & 0 & 1 \\ 0 & 0 & 0 & 0 & 1 & 0 & 0 & 0 & 0 \\ 1 & 0 & 0 & 0 & 0 & 1 & 0 & 0 & 0 \\ 0 & 0 & 1 & 0 & 0 & 0 & 0 & 1 & 0 \\ 0 & 0 & 0 & 1 & 0 & 0 & 0 & 0 & 0 \\ 0 & 0 & 0 & 0 & 0 & 0 & 0 & 0 & 1 \\ 0 & 0 & 0 & 0 & 1 & 0 & 0 & 0 & 0 \\ 0 & 1 & 0 & 0 & 0 & 0 & 1 & 0 & 0 \end{pmatrix} \quad (8)$$

$$\mu^J = \begin{pmatrix} 0 & 1 & 0 & 0 & 0 & 0 & 0 & 0 & 0 \\ 1 & 0 & 1 & 0 & 0 & 0 & 0 & 0 & 0 \\ 0 & 1 & 0 & 0 & 0 & 0 & 0 & 0 & 0 \\ 0 & 0 & 0 & 0 & 0 & 0 & 0 & 0 & 1 \\ 0 & 0 & 0 & 0 & 0 & 0 & 0 & 0 & 1 \\ 0 & 0 & 0 & 0 & 0 & 0 & 1 & 0 & 0 \\ 0 & 0 & 0 & 0 & 0 & 1 & 0 & 1 & 0 \\ 0 & 0 & 0 & 0 & 0 & 0 & 1 & 0 & 0 \\ 0 & 0 & 0 & 1 & 1 & 0 & 0 & 0 & 0 \end{pmatrix} \quad (9)$$

Applying such $\mu^I$ leads to a similarity function equal to a sum of distances between all points with coordinate difference=(1,0,0) or (−1,0,0) (i.e. between points having a coordinate difference of one unit along one direction and zero along other directions). Similarity functions along I and J directions (Equations (6) and (7) above) may be used to define a total optimal similarity function G in each possible IJ plane, as given by Equations (10) through (13) below:

$$D(K, \varphi, \theta, \psi) = (SimI^2(K, \varphi, \theta, \psi) + SimJ^2(K, \varphi, \theta, \psi)) \quad (10)$$

$$G(K) = \min_{\varphi, \theta, \psi} D(K, \varphi, \theta, \psi) \quad (11)$$

$$(\varphi^*, \theta^*, \psi^*) = \underset{\varphi,\theta,\psi}{\arg\min} D(K, \varphi, \theta, \psi) \quad (12)$$

$$\varphi \in \Phi, \theta \in \Theta, \psi \in \Psi \quad (13)$$

As seen from the above similarity function G(K), in at least some implementations, an arbitrary point K can define a minimum possible value of a total similarity function for a defined range of rotations. The similarity function G(K) may be used as a discontinuity measure since its values are low if there is a particular plane with good correlation of values along it. At the same time, the similarity function G(K) may have relatively high values in fault zones, and relatively higher values in chaotic regions without any spatial correlation of values. It will be appreciated that for each of the functions represented above, a different template (with different geometry, etc.) may be used, which may thereby provide improved quality of interpretation results.

To separate areas or zones within a geological structure (e.g. a fault zone from a chaotic zone), another measure can be used, as given by Equation (14) below:

$$G^*(K) = (\mathrm{Sim}I(K,\phi,\theta,\psi) - \mathrm{Sim}J(K,\phi,\theta,\psi))^2 \quad (14)$$

where ($\phi^*, \theta^*, \psi^*$) is the minimum's argument in the definition of the similarity function G(K). In at least some implementations, this measure is based on the above-referenced unique characteristic of the fault area, specifically, a relatively high anisotropy of points in terms of the sample-based distance D. After a minimum of the sample-based distance D is reached in ($\phi^*, \theta^*, \psi^*$), the template may be oriented for best fit to the main direction in the fault area (e.g. re-orienting a template defining the I and J directions to provide an improved alignment of at least one of the I direction or the J direction with a main direction in a fault area). In isotropic areas, the similarity function G*(K) can have low values since both similarities along I and J directions in the best fit plane can be the same order of magnitude. At the same time, in the fault area one direction could be close to the main and, consequently, have a smaller value of similarity than another.

Therefore, in accordance with at least some implementations, the measure of the similarity function G*(K) (Equation (14) above) at every point K in a seismic volume could be used as a reliable indicator of a fault zone.

In addition, in further implementations, some improvements can be implemented to enhance contrast between a main direction and other directions around the fault zone. For example, in at least some implementations, an angle decomposition can be used to reduce computational times (or increase the speed of computations). Specifically, this may be accomplished by decomposing the minimization of the similarity function G(K) into two parts, given by Equations (15) and (16) below:

$$\hat{G}(K, \varphi) = \underset{\theta,\psi}{\min} \mathrm{Sim}I(K, \varphi, \theta, \psi) \quad (15)$$

$$(\theta^*, \psi^*) = \underset{\theta,\psi}{\arg\min} \mathrm{Sim}I(K, \varphi, \theta, \psi) \quad (15.1)$$

$$G(K) = \underset{\varphi}{\min} D(K, \varphi, \theta^*, \psi^*) \quad (16)$$

$$\varphi^* = \underset{\varphi}{\arg\min} D(K, \varphi^*, \theta^*, \psi^*) \quad (16.1)$$

It will be appreciated that, in some implementations, the minimization of the similarity function G(K) which enables the valuation at ($\phi^*, \theta^*, \psi^*$) of the similarity function G*(K) (where ($\phi^*, \theta^*, \psi^*$) is the minimum's argument as shown in Equation (14)), this calculation can provide important estimations for local dip and azimuth angles. Thus, unlike other methods for estimation of the local dip and azimuth angles, the approach described herein may have user-defined settings, and therefore allows improved control over an estimation's neighborhood size.

Figure 4:
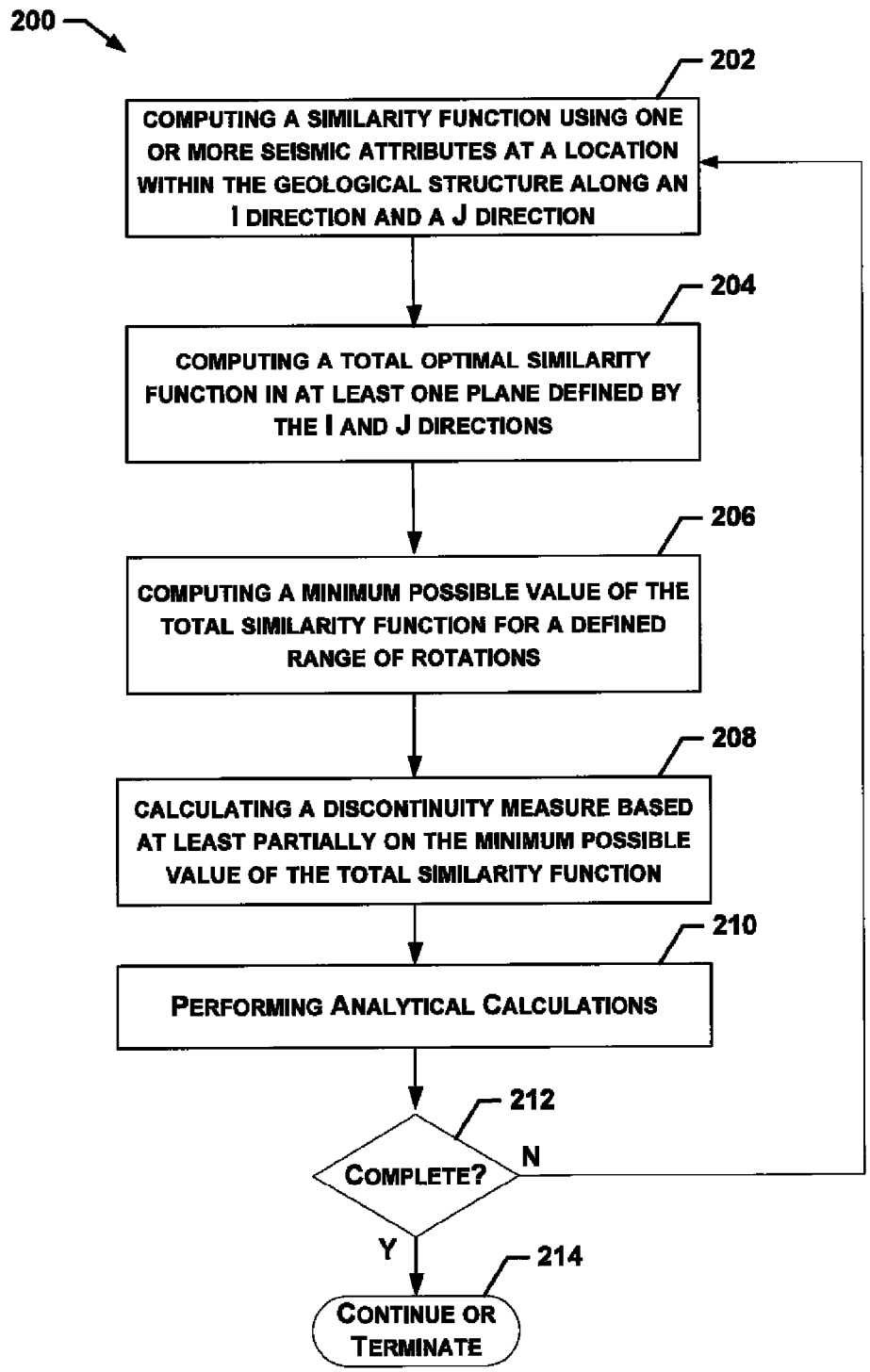
FIG. 4 shows a flowchart of another embodiment of a process in accordance with the teachings of the present disclosure.

From the description above, a variety of processes for analyzing a geological structure based at least partially on one or more seismic attributes may be implemented. For example, FIG. 4 shows a flowchart of another embodiment of a process 200 in accordance with the teachings of the present disclosure. In this embodiment, the process 200 includes computing a similarity function using one or more seismic attributes at a location within the geological structure along an I direction and a J direction at 202. For example, in at least some implementations, the computation of the similarity function at 202 may include computing a similarity function substantially using at least one of Equations (6) and (7) shown above.

As further shown in FIG. 4, in this embodiment, the process 200 includes computing a total optimal similarity function in at least one plane defined by the I and J directions at 204. For example, in at least some implementations, the computing of the total optimal similarity function at 204 may include computing a total optimal similarity function G in one or more IJ planes, as given by Equations (10) through (13) shown above.

In the embodiment shown in FIG. 4, the process 200 further includes computing a minimum possible value of the total similarity function for a defined range of rotations at 206, and calculating a discontinuity measure based at least partially on the minimum possible value of the total similarity function at 208. At 210, the process 200 includes performing analytical calculations, including, for example, analyzing a geological structure based at least partially on one or more seismic attributes. At 212, the process 200 determines whether the desired analytical calculations are complete. If not, the process 200 returns and iteratively repeats the activities 202 through 208. Otherwise, the process 200 may terminate or continue to other activities at 214. It will be appreciated that one or more of the activities of the processes described herein, including the processes and activities described above with respect to FIGS. 1 through 4, may either be tied to a particular apparatus, or may involve a transformation of something (e.g. data, information, etc.) into a different state or thing.

From the foregoing detailed description, it will be appreciated that embodiments of methods and systems in accordance with the teachings of the present disclosure may provide considerable advantages over conventional techniques. Several examples of how such embodiments may be used are described below, however, these brief examples are merely representative and should not be construed to in any way limit the functionality or applicability of the methods and systems described herein, or the scope of the claims listed below.

For example, in one or more implementations, embodiments in accordance with the present disclosure may not have an inherent limitation of other methods, namely, that of high values of resulting attributes in noisy areas. In at least some implementations, by overcoming this limitation of at least some prior art methods, improved analyses of geological structures may be achieved.

Similarly, in at least some implementations, embodiments in accordance with the present disclosure may allow identification of both large and small discontinuities. In some aspects, user-specified settings may provide improved control over a desired (or required) refinement of the analysis.

Embodiments of methods and systems in accordance with the present disclosure may also not be based on any assumptions about geometrical shape of faults, or termination or reservoir layers. Such embodiments may therefore be applied to a wide range of available data. In addition, in at least some implementations, along with the identification of faults and terminations, embodiments in accordance with the present disclosure may provide robust estimation of reservoir dip and azimuth angles.

Exemplary Computational Environment

Figure 5:
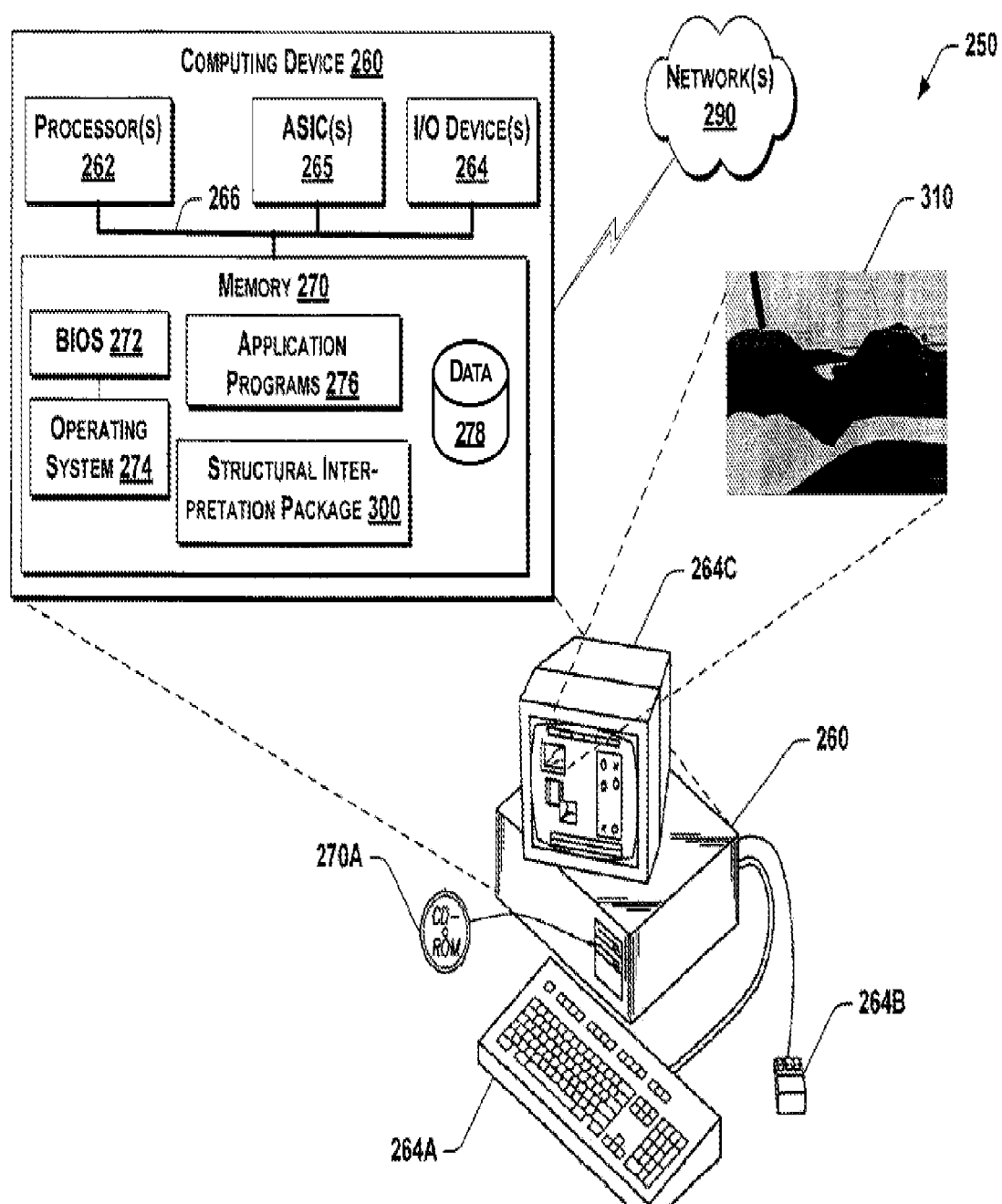
FIG. 5 illustrates an example computing device in which various embodiments of methods and systems in accordance with the teachings of the present disclosure may be implemented.

Systems and methods for analysis of geological structures using seismic attributes in accordance with the teachings of the present disclosure may be implemented in a variety of computational environments. For example, FIG. 5 illustrates an exemplary environment 250 in which various embodiments of systems and methods in accordance with the teachings of the present disclosure can be implemented. In this implementation, the environment 250 includes a computing device 260 configured in accordance with the teachings of the present disclosure. In some embodiments, the computing device 260 may include one or more processors 262 and one or more input/output (I/O) devices 264 coupled to a memory 270 by a bus 266. One or more Application Specific Integrated Circuits (ASICs) 265 may be coupled to the bus 266 and configured to perform one or more desired functionalities described herein.

The one or more processors 262 and/or the one or more ASICs 265 may be composed of any suitable combination of hardware, software, or firmware to provide the desired functionality described herein. Similarly, the I/O devices 264 may include any suitable I/O devices, including, for example, a keyboard 264A, a cursor control device (e.g. mouse 264B), a display device (or monitor) 264C, a microphone, a scanner, a speaker, a printer, a network card, or any other suitable I/O device. In some embodiments, one or more of the I/O components 264 may be configured to operatively communicate with one or more external networks 290, such as a cellular telephone network, a satellite network, an information network (e.g. Internet, intranet, cellular network, cable network, fiber optic network, LAN, WAN, etc.), an infrared or radio wave communication network, or any other suitable network. The system bus 266 of the computing device 260 may represent any of the several types of bus structures (or combinations of bus structures), including a memory bus or memory controller, a peripheral bus, an accelerated graphics port, and a processor or local bus using any of a variety of bus architectures.

The memory 270 may include one or more computer-readable media configured to store data and/or program modules for implementing the techniques disclosed herein. For example, the memory 270 may host (or store) a basic input/output system (BIOS) 272, an operating system 274, one or more application programs 276, and program data 278 that can be accessed by the one or more processors 262 for performing various functions disclosed herein.

The computing device 260 may further include a structural interpretation package 300 in accordance with the teachings of the present disclosure. More specifically, the structural interpretation package 300 may be configured to perform analysis of a geological structure 310 using seismic attributes, including, for example, those processes and activities described above (e.g. as shown and described with respect to FIGS. 3 and 4).

As depicted in FIG. 5, the structural interpretation package 300 may be stored within (or hosted by) the memory 270. In alternate implementations, however, the structural interpretation package 300 may reside within or be distributed among one or more other components or portions of the computing device 260. For example, in some implementations, one or more aspects of the structural interpretation functionalities described herein may reside in one or more of the processors 262, the I/O devices 264, the ASICs 265, or the memory 270 (e.g. one or more application programs 276).

In the foregoing description, various techniques have been or may be described in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media may include, but is not limited to, random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the computing device 260. Combinations of any of the above should also be included within the scope of computer readable media.

Moreover, the computer-readable media included in the system memory 220 can be any available media that can be accessed by the computing device 260, including removable computer storage media (e.g. CD-ROM 220A) or non-removable storage media.

Computer storage media may include both volatile and nonvolatile media (or persistent and non-persistent) implemented in any method or technology for storage of information such as computer-readable instructions, data structures, program modules, or other data. Generally, program modules executed on the computing device 260 may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Referring again to FIG. 5, it will be appreciated that the computing device 260 is merely exemplary, and represents only one example of many possible environments (e.g. computing devices, architectures, etc.) that are suitable for use in accordance with the teachings of the present disclosure. Therefore, the computing device 260 shown in FIG. 5 is not intended to suggest any limitation as to scope of use or functionality of the computing device and/or its possible architectures. Neither should computing device 260 be interpreted as having any dependency or requirement relating to any one or combination of components illustrated in the example computing device 260.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Although embodiments of systems and methods for automated structural interpretation have been described in language specific to structural features and/or methods, it is to be understood that the subject of the appended claims is not necessarily limited to the specific features or methods described. Rather, the specific features and methods are disclosed as exemplary implementations of automated structural interpretation.

What is claimed is:

1. A method, comprising:
   receiving one or more signals using a receiver;
   determining one or more seismic attributes based on the one or more signals; and
   analyzing, using a processor, a geological structure based at least partially on the one or more seismic attributes, including:
   computing a similarity function using the one or more seismic attributes at a location within the geological structure along an I direction and a J direction;
   computing a total optimal similarity function in at least one plane defined by the I and J directions;
   computing a minimum possible value of the total optimal similarity function for a defined range of rotations; and
   calculating a discontinuity measure based at least partially on the minimum possible value of the total optimal similarity function.

2. The method of claim 1, wherein computing the similarity function using the one or more seismic attributes at the location within the geological structure along the I direction and the J direction includes:
   computing the similarity function substantially using:

$$SimI(K, \varphi, \theta, \psi) = \sum_{\Lambda_t, \Lambda_r \in \hat{\Lambda}, t > r} L(\Lambda_t(K_t, \varphi, \theta, \psi), \Lambda_r(K_r, \varphi, \theta, \psi)) \mu_{tr}^I$$

or $$SimJ(K, \varphi, \theta, \psi) = \sum_{\Lambda_t, \Lambda_r \in \hat{\Lambda}, t > r} L(\Lambda_t(K_t, \varphi, \theta, \psi), \Lambda_r(K_r, \varphi, \theta, \psi)) \mu_{tr}^J.$$

or both,
wherein K is a kernel point, L is a sample-based distance, $\Lambda$ is a sample extracted around a kernel point and denotes an array of seismic failures, $\phi$ is an angle of rotation around an X-axis, $\theta$ is an angle of rotation around a Y-axis, $\psi$ is an angle of rotation around a Z-axis, SimJ is a measure of similarity along a J-direction, SimI is a measure of similarity along an I-direction, and $\mu$ is a set of weights.

3. The method of claim 1, wherein computing the total optimal similarity function in the at least one plane defined by the I and J directions includes:
   computing the total optimal similarity function G in one or more IJ planes, as given by:

$$D(K, \varphi, \theta, \psi) = (SimI^2(K, \varphi, \theta, \psi) + SimJ^2(K, \varphi, \theta, \psi))$$

$$G(K) = \min_{\varphi, \theta, \psi} D(K, \varphi, \theta, \psi)$$

$$(\varphi^*, \theta^*, \psi^*) = \operatorname*{argmin}_{\varphi, \theta, \psi} D(K, \varphi, \theta, \psi)$$

$$\varphi \in \Phi, \theta \in \Theta, \psi \in \Psi.$$

wherein D is a combined measurement of similarities in the I and J directions, $\phi$ is a set of rotation angles about the X-axis, $\Theta$ is a set of rotation angles about the Y-axis, and $\Psi$ is a set of rotation angles about the Z-axis, $\phi^*$ is an angle of rotation around an X-axis associated with a minimum value of D, $\theta^*$ is an angle of rotation around a Y-axis associated with the minimum value of D, 104 * is an angle of rotation around a Z-axis associated with the minimum value of D.

4. The method of claim 1, wherein analyzing the geological structure based at least partially on the one or more seismic attributes further includes:
   after computing the minimum possible value of the total optimal similarity function for a defined range of rotations, re-orienting a template defining the I and J directions to provide an improved alignment of at least one of the I direction or the J direction with a main direction in a fault area.

5. The method of claim 1, wherein analyzing the geological structure based at least partially on the one or more seismic attributes further includes:
   adjusting one or more user-defined settings that at least partially control an estimation size.

6. The method of claim 1, wherein analyzing the geological structure based at least partially on the one or more seismic attributes further includes:
   computing a dip angle, or an azimuth angle, or both, based at least partially on the computed minimum possible value of the total similarity function.

7. The method of claim 1, wherein analyzing the geological structure based at least partially on the one or more seismic attributes includes:
   performing one or more computations using a processor.

8. The method of claim 1, wherein analyzing the geological structure based at least partially on the one or more seismic attributes further includes:
   performing an angular decomposition on the minimum possible value of the total optimal similarity function.

9. The method of claim 8, wherein performing the angular decomposition on the minimum possible value of the total optimal similarity function includes:
   performing an angular decomposition on the minimization of the total optimal similarity function, the angular decomposition being given by:

$$\hat{G}(K,\varphi) = \min_{\theta,\psi} \text{SimI}(K,\varphi,\theta,\psi)$$

$$(\theta^*, \psi^*) = \underset{\theta,\psi}{\text{argmin}}\, \text{SimI}(K,\varphi,\theta,\psi)$$

$$G(K) = \min_{\varphi} D(K,\varphi,\theta^*,\psi^*)$$

$$\varphi^* = \underset{\varphi}{\text{argmin}}\, D(K,\varphi^*,\theta^*,\psi^*).$$

wherein K is a kernel point, D is a combined measurement of similarities in the I and J directions, φ is an angle of rotation around an X-axis, θ is an angle of rotation about a Y-axis, ψ is an angle of rotation around a Z-axis, SimI is a measure of similarity along an I-direction, φ* is an angle of rotation around an X-axis associated with a minimum value of D, θ* is an angle of rotation around a Y-axis associated with the minimum value of D, ψ* is an angle of rotation around a Z-axis associated with the minimum value of D.

10. The method of claim 1, wherein analyzing a geological structure based at least partially on the one or more seismic attributes further includes:
classifying the location in the geological structure based at least partially on the total optimal similarity function, or the discontinuity measure, or both.

11. The method of claim 10, wherein classifying the location in the geological structure includes:
classifying the location in the geological structure based at least partially on a correlation between samples along one or more directions.

12. The method of claim 10, wherein classifying the location in the geological structure includes:
classifying the location in the geological structure based on the discontinuity measure G*(K) given substantially by:

$$G^*(K) = (\text{SimI}(K,\varphi,\theta,\psi) - \text{SimJ}(K,\varphi,\theta,\psi))^2,$$

wherein K is a kernel point, φ is an angle of rotation around an X-axis, θ is an angle of rotation about a Y-axis, ψ is an angle of rotation around a Z-axis, SimI is a measure of similarity along an I-direction, and SimJ is a measure of similarity along a J-direction.

13. A computing device, comprising:
one or more processors; and
one or more computer readable media containing instructions that, when executed by at least one of the one or more processors, cause the computing device to analyze a geological structure, including:
computing a similarity function using one or more seismic attributes at a location within the geological structure along an I direction and a J direction;
computing a total optimal similarity function in at least one plane defined by the I and J directions;
computing a minimum possible value of the total optimal similarity function for a defined range of rotations; and
calculating a discontinuity measure based at least partially on the minimum possible value of the total optimal similarity function.

14. The computing device of claim 13, wherein computing the similarity function using the one or more seismic attributes at the location within the geological structure along an I direction and a J direction includes:
computing the similarity function substantially using:

$$\text{SimI}(K,\varphi,\theta,\psi) = \sum_{\Lambda_t,\Lambda_r \in \hat{\Lambda}, t > r} L(\Lambda_t(K_t,\varphi,\theta,\psi), \Lambda_r(K_r,\varphi,\theta,\psi))\mu_{tr}^I$$

or $$\text{SimJ}(K,\varphi,\theta,\psi) = \sum_{\Lambda_t,\Lambda_r \in \hat{\Lambda}, t > r} L(\Lambda_t(K_t,\varphi,\theta,\psi), \Lambda_r(K_r,\varphi,\theta,\psi))\mu_{tr}^J.$$

or both,
wherein K is a kernel point, L is a sample-based distance, Λ is a sample extracted around a kernel point and denotes an array of seismic failures, φ is an angle of rotation around an X-axis, θ is an angle of rotation around a Y-axis, ψ is an angle of rotation around a Z-axis, SimJ is a measure of similarity along a J-direction, SimI is a measure of similarity along an I-direction, and ,μ is a set of weights.

15. The computing device of claim 13, wherein analyzing the geological structure based at least partially on the one or more seismic attributes further includes:
after computing the minimum possible value of the total optimal similarity function for a defined range of rotations, re-orienting a template defining the I and J directions to provide an improved alignment of the I direction, or the J direction, or both, with a main direction in a fault area.

16. The computing device of claim 13, wherein analyzing the geological structure based at least partially on the one or more seismic attributes further includes:
performing an angular decomposition on the minimum possible value of the total optimal similarity function.

17. The computing device of claim 13, wherein analyzing a geological structure based at least partially on one or more seismic attributes further includes:
classifying the location in the geological structure based at least partially on the total optimal similarity function, or the discontinuity measure, or both.

18. One or more non-transitory computer-readable media having a set of computer-readable instructions residing thereon that, when executed by a processor, perform an analysis of a geological structure comprising:
using one or more seismic attributes to determine a similarity function at a location within the geological structure along an I direction and a J direction;
determining a total optimal similarity function in a plane defined by the I and J directions;
determining a minimum possible value of the total optimal similarity function over a rotational range; and
using the minimum possible value of the total optimal similarity function to determine a discontinuity measure.

19. The one or more computer-readable media of claim 18, wherein the analysis of the geological structure further includes:
classifying the location based at least partially on the total optimal similarity function, or the discontinuity measure, or both.

20. The one or more computer-readable media of claim 18, wherein
the similarity function is equal to a sum of distances between points having a coordinate difference of one unit along a first direction and zero along one or more other directions.

* * * * *